Figure 1:
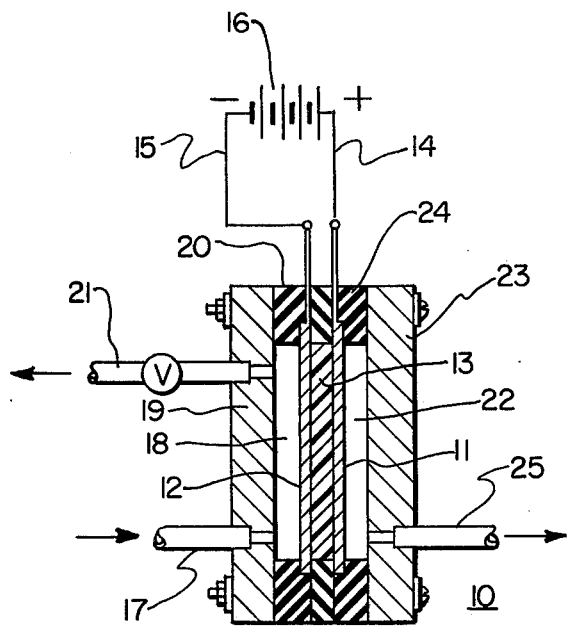

United States Patent [19]

LaConti et al.

[11] 4,039,409
[45] Aug. 2, 1977

[54] METHOD FOR GAS GENERATION UTILIZING PLATINUM METAL ELECTROCATALYST CONTAINING 5 TO 60% RUTHENIUM

[75] Inventors: Anthony B. LaConti, Lynnfield; Anthony R. Fragala, N. Andover, both of Mass.

[73] Assignee: General Electric Company, Wilmington, Mass.

[21] Appl. No.: 637,519

[22] Filed: Dec. 4, 1975

[51] Int. Cl.² .............................................. C25B 1/10
[52] U.S. Cl. .................................................... 204/129
[58] Field of Search .......................... 204/129, DIG. 3

[56] References Cited

U.S. PATENT DOCUMENTS

| | | | |
|---|---|---|---|
| 3,291,753 | 12/1966 | Thompson | 429/40 |
| 3,297,484 | 1/1967 | Niedrach | 136/86 R |
| 3,401,099 | 9/1968 | McEvoy | 204/129 |
| 3,410,770 | 11/1968 | Buechler | 204/129 |

FOREIGN PATENT DOCUMENTS 1,028,325  5/1966  United Kingdom ................... 429/40

Primary Examiner—R. L. Andrews

[57] ABSTRACT

A gas generation apparatus is described which utilizes a novel catalytic oxygen evolving electrode for such electrochemical systems as electrolysis and oxygen concentrator cells. The oxygen concentration and the electroylsis cells include a catalytic cathode, an improved catalytic anode containing an active reduced platinoid electrocatalyst containing 5 to 60% ruthenium. The cathode and the novel catalytic anode are positioned on opposite sides of a cation exchange membrane with a source of direct current potential being connected between the two electrodes to concentrate gases such as oxygen or generate gases by an electrolysis process.

3 Claims, 5 Drawing Figures

METHOD FOR GAS GENERATION UTILIZING PLATINUM METAL ELECTROCATALYST CONTAINING 5 TO 60% RUTHENIUM

This invention relates to methods and apparatus for the generation of gases. More particularly, it relates to methods and apparatus for the concentration of oxygen and for the generation of oxygen and hydrogen by electrolysis by the use of an improved catalytic oxygen evolving anode electrode.

Electrochemical cells of the type utilizing an ion-exchange-medium associated with a pair of catalytic electrodes have been described in the prior art in various forms and applications. In one form, such electrochemical cells may be utilized to generate electrical energy and are commonly known as fuel cells. In a fuel cell reactants are supplied to electrodes, as for example, hydrogen to the anode and oxygen to the cathode, and as a result thereof, electrical energy is generated and a byproduct water is formed at one of the electrodes. One form of such a fuel cell uses as ion-exchange-medium in the form of a solid, hydrated, ion-exchange-membrane and is described and claimed in U.S. Pat. No. 3,297,484 entitled, "Electrode Structure and Fuel Cell Incorporating the Same," which issued on Jan. 10, 1967 in the name of Leonard W. Niedrach and is assigned to the General Electric Company, the assignee of the present invention.

Various metals and alloys are utilized as the catalytic electrodes for such fuel cells and in other electrochemical cells which when operated in a different mode perform a different function. Thus, if a cell assembly, which in many respects may be very similar to a fuel cell (in that two catalytic electrodes are positioned adjacent to an ion-transporting electrolyte medium), has an external source of electrical energy applied across the electrodes, the cell may then be utilized as a gas generating apparatus. For example, if water is supplied to one or both of the electrodes of the cell, dissociation, i.e., electrolysis of the water can take place and oxygen and hydrogen are produced at the two electrodes as one of the gases, i.e., hydrogen is selectively transported across the medium. Such an apparatus operating in the gas generation mode is also useful in the concentration of a gas such as oxygen or hydrogen, for example. By thus utilizing the driving force of an applied potential as well as the permselective nature of an ion-exchange-membrane electrolyte, an oxidant such as air or impure oxygen may be fed to the cathode of the apparatus. An ionic product is formed at one of the catalytic electrodes and passes through the electrolyte to the opposite electrode (the anode) where a molecular gas is formed. Since such gas concentrating and electrolysis cells both utilize catalytic electrodes, the performance of the catalyst at the gas evolving electrode is crucial in determining the effectiveness and efficiency of the cell and consequently, of the economics of the process. Thus, such catalysts as platinum, platinum black, platinum-iridium have in the past been used as catalysts for various of these cells.

It was also found however, that the choice of a catalyst in an electrochemical cell and its effectiveness in a given cell, depends upon a complex set of variables such as the surface area of a catalyst, availability of oxides of its species on the catalyst surface, contaminants in the reactants, and the nature of the conversion taking place in the cell. Consequently, it is and always has been difficult to predict the applicability of a catalyst useful in one electrochemical cell to a different system. Thus, in the past, it was always known that in fuel cell applications, the use of certain alloys such as platinum-iridium were mandated whenever the reactants contained contaminants such as carbon monoxide, even though such platinum-iridium alloys not only were more expensive than pure platinum or platinum black alloys but also resulted in poorer performance and efficiencies than the pure platinum or platinum black alloys. That is, in fuel cells platinum-iridium alloys were used where the reactants contained as carbon monoxide because the platinum-iridium alloys were resistant to poisoning of the alloys by the carbon monoxide. Thus, the compromise had to be made in the sense that improved resistance to catalyst poisoning was achieved even though the alloy was more expensive and relatively poor in efficiency in that the output from the fuel cell was lower when a platinum iridium alloy was used than when pure platinum or platinum black was utilized.

In a copending patent application, Ser. No. 554,428 entitled, "Method and Apparatus for Gas Generation," filed Feb. 28, 1975 in the names of Ivan Danzig, et al, which in turn, is a continuation of application Ser. No. 334,196 filed Feb. 21, 1973, which in turn, is a continuation of Ser. No. 112,891, viled Feb. 5, 1971, which is assigned to the General Electric Company, assignee of the present invention, an electrolysis and oxygen concentrating cell is disclosed utilizing an improved oxygen evolving catalytic anode. The improved oxygen evolving electrode utilized a platinum-iridium alloy which was found to provide much improved performance and efficiency even though the use of such platinum-iridium alloys as electrodes in fuel cells had always resulted in poorer performance of the cell. The improved oxygen evolving electrode including the reduced platinum iridium catalyst described in the above identified application provides excellence in performance. However, the iridium utilized as the alloying metal is a noble metal which is quite expensive and makes the electrodes quite costly. Applicant has now found that an oxygen evolving electrode may be utilized in a gas generating system which is not only substantially less expensive because it uses less expensive materials to alloy with platinum, but is also more efficient than ones utilizing platinum-iridium alloys. Applicant has found that an oxygen evolution electrode utilizing an electrocatalyst which is a reduced alloy of platinum and ruthenium containing 5 to 60% ruthenium, provides better performance than a reduced Pt-Ir catalyst and is much less expensive since the cost of ruthenium salts utilized to fabricate the alloy is approximately 50% of that of iridium salts. In addition, it has been found that further improvements in performance and cost may be realized because the electrodes may be fabricated with a greater percentage content of ruthenium, which is the least expensive component of the alloy, than is possible for iridium. That is, as described in the patent application referred to above, 50% iridium is approximately the maximum content because any increase in the iridium content results in a highly fragile and dimensionally unstable electrode. Thus, though an increase in the percentage of iridium might increase the efficiency of the electrode, even further, the problems due to mechanical stability of the electrode limits the iridium concentration as a practical matter to 50%. With ruthenium, on the other hand, it has been found that the ruthenium content can be as high as 60%, with the resulting improvement in performance and reduction in cost, while still maintaining structural integrity of the electrode.

It is therefore the primary objective of our invention to provide an improved method of gas generation utilizing an improved electrocatalyst at the gas evolving electrode.

A further objective of the invention is to provide an improved gas generation apparatus with which to concentrate gases or to produce gaseous electrolysis which utilizes a catalyst which provides improved performance and reduced cost.

Another objective of the invention is to provide an improved gas generation apparatus and a process for concentrating oxygen or producing oxygen and oxygen by electrolysis utilizing an improved catalyst at the oxygen evolving electrode.

Other objectives and advantages of the invention will become apparent as the description thereof proceeds.

In accordance with one aspect of the invention, a gas generating apparatus is provided which includes a catalytic cathode, an improved gas evolving catalytic anode containing a reduced platinum-ruthenium alloy containing 5 to 60% weight percent of ruthenium positioned on opposite faces of a cation exchange membrane. A direct current potential is applied between the cathode and the anode and a hydrogen containing compound such as water, HCl or an organic compound is applied at one electrode. Alternatively, an impure stream containing a gaseous constituent such as oxygen or hydrogen is furnished at one electrode and purified or concentrated gas is taken from the other.

Figure 2:
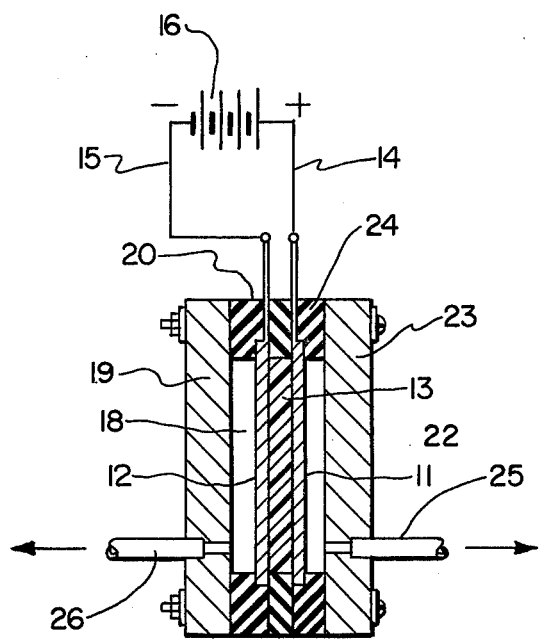
Figure 3:
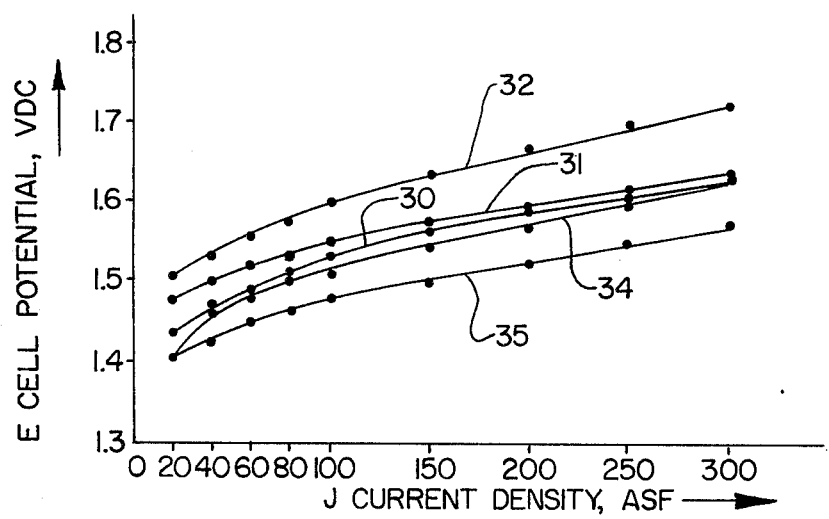
Figure 4:
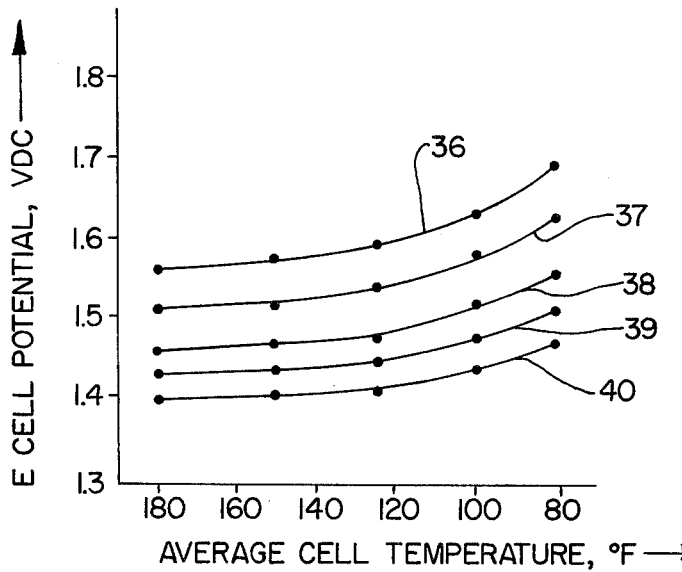
Figure 5:
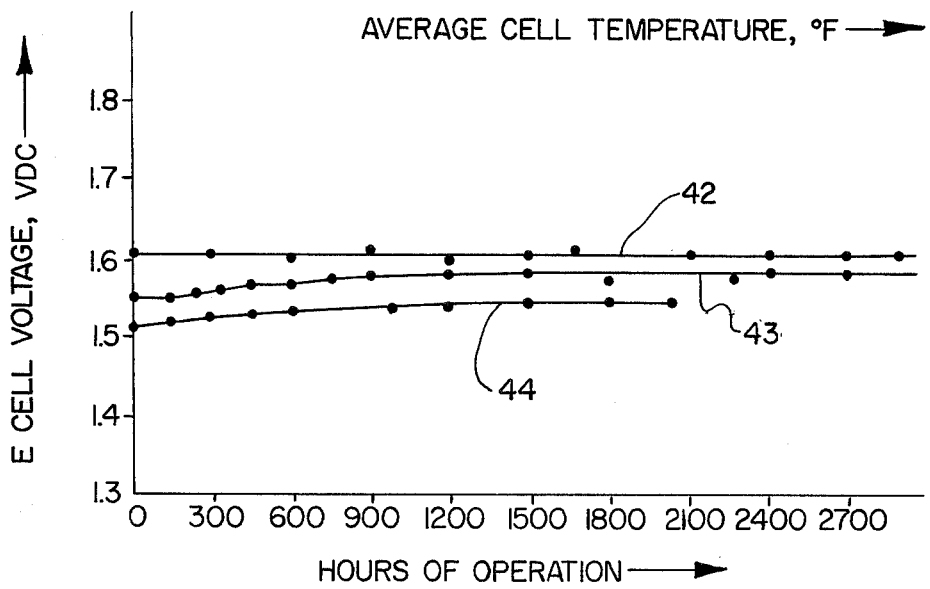

These and various other objectives, features and advantages of the invention will be best understood from the following description taken in connection with the accompanying drawings in which:

FIG. 1 is a sectional view of a gas generating apparatus of the gas concentrator type made in accordance with our invention and capable of practicing the process of our invention; and FIG. 2 is a sectional view of a gas generation apparatus for the production of gases such as oxygen and hydrogen by electrolysis which is capable of practicing the process of the invention and is constructed in accordance with our invention, FIGS. 3-5 are graphs showing the performance of cells using such Pt-Ru catalysts.

In FIG. 1 of the drawings, there is shown generally at 10 a gas generation apparatus in the form of an oxygen concentrator embodying the invention and capable of practicing the process of the invention. Apparatus 10 is shown with a catalytic anode 11, a catalytic cathode 12 and an ion-exchange-membrane 13 positioned between and in electrical contact with anode 11 and cathode 12. Electrical leads 14 and 15 are connected to electrodes 11 and 12 and to an external power source 16 shown in the form of a battery connected across the electrodes. An oxidant, such as air or impure oxygen (neither of which contain carbon monoxide or carbon fuel contaminants) is supplied to cathode 12 through an inlet conduit 17 and chamber 18 formed by endplate 19, gasket 20 and electrode 12. A valved outlet 21 is provided for exhausting impurities from chamber 18. An output gas chamber 22 is formed by electrode 11, endplate 23 and gasket 24. The concentrated oxygen provided to chamber 22 is supplied through a suitable outlet conduit 25 for consumption or storage. A variety of ion-exchange-membranes may be used in the cell. One which functions very adequately is a perfluorocarbon sulfonic acid solid polymer electrolyte sold by duPont under its trade designation "Nafion." Various catalytic materials such as platinum black, for example, may be utilized for the cathode. The catalytic electrodes, both cathode and anode, are customarily pressed into the surface of the ion-exchange-membrane. Reference is hereby made to the above identified U.S. Pat. No. 3,297,484 which identifies various catalytic cathode materials, additional ion-exchange-membrane materials, their properties and mode of preparation and is hereby incorporated by reference in this application.

The improved catalytic anode of the present invention employs a reduced platinum ruthenium alloy containing 5 to 60 weight percent of ruthenium. Such a catalytic alloy can be prepared by a widely used method of alloying metals namely by thermally decomposing mixed metal salts. This is the technique considered to be most suitable for the preparation of platinum-ruthenium alloys. The preferred manner of preparation is by modifying the Adams method of platinum preparation by the addition of a thermally decomposable ruthenium halide such as ruthenium chloride to an appropriate quantity of chloroplatinic acid and an excess sodium nitrate. The Adams method of platinum preparation is disclosed by R. Adams and R. L. Shriner in the Journal of American Electrochemical Society Vol. 45, page 2171 published in 1923. It is convenient to mix the finally divided halide salts of platinum (in the form of chloroplatinic acid) and ruthenium (in the form of ruthenium chloride) in the same weight of ratio of platinum and ruthenium desired in the final alloy. An excess of sodium nitrate is incorporated and the mixture fused in a silica dish at 500° C for 3 hours. The residue is then washed thoroughly to remove the soluble nitrates and halides salts present leaving a residue of platinum-ruthenium oxide. The resulting suspension of mixed oxides is reduced at room temperature by bubbling hydrogen therethrough or by using an electrochemical reduction technique, i.e., electrochemical reduction in acid media. The latter method is preferred. The product which is now a reduced platinum-ruthenium alloy is dried thoroughly as by the use of a heat lamp, ground and is then sieved through a 400 mesh nylon screen.

The electrode is formed as a "Teflon" bonded alloy mixture by blending the catalyst with a Teflon dipersion to produce the bonded electrode structure in the manner described in the above identified U.S. Pat. No. 3,297,484. In the process of bonding of the electrode, it is necessary to blend the catalyst with Teflon dispersions in such a manner that the dispersion contains little or no hydrocarbons. That is, it is customary in producing a Teflon catalyst dispersion to utilize a surface active agent to keep the Teflon particles dispersed in a water solution. Certain of the commercially available Teflon compositions contain long-chain hydrocarbon organic surface active agents such as the ones sold by Rohm-Haas under their trade designation Triton X 100. It has been found that these hydrocarbon agents result in loss of surface area of the reduced platinum-ruthenium catalyst or in some instances cause sintering of the catalyst and thereby reduce the amount of surface area. Any reduction in the surface area of the catalyst has a deleterious effect on the efficiency and effectiveness of the catalyst. Thus, Teflon dispersions which include hydrocarbon surface active agents should preferably not be utilized in fabricating the bonded electrode. Instead, dispersions of Teflon which contain no hydrocarbon surface active agents such as T-42 or dry teflon powders (T-7) should be utilized. Both of these products are sold by duPont. With the former, perfluorooctansic acid is added as a surface active agent to produce a more uniform blend when preparing catalyst. In summary, fabrication of the electrode in accordance with the procedure described in U.S. Pat. No. 3,297,484 above requires that care be taken to avoid the use of hydrocarbon surface active agents.

In operation of the oxygen concentrator shown in FIG. 1, air or impure oxygen (both of which are free of CO or carbon fuel contaminants) is supplied through inlet 17 and chamber 18 to cathode 12. A direct current potential is applied across cathode 12 and anode 11 from battery 16 to concentrate the oxygen which collects in chamber 22 and is removed through outlet 25.

In FIG. 2 of the drawings, there is shown a gas generation apparatus in the form of an electrolysis cell. The same numbers as in FIG. 1 have been used to show similar parts in FIG. 2. In this cell, oxygen chamber 22 communicates with oxygen outlet 25 while hydrogen chamber 18 communicates with hydrogen outlet 26.

In operation of the electrolysis cell of FIG. 2, a direct current potential is applied across anode 11 and cathode 12 from battery 16 while a hydrogen containing compound such as water for example is supplied at the anode. The direct current potential applied across anode 11 and cathode 12 dissociates water at the anode to produce oxygen and hydrogen at the two respective electrodes. The hydrogen in chamber 18 is removed to outlet 26 while oxygen in chamber 22 is removed to outlet 25.

In the oxygen concentrator of FIG. 1, air or impure oxygen is furnished to the cathode along with water either from a wicking, through humidification of the steam, or through back diffusion through the ion-exchange-membrane. With a cation exchange membrane employed between the electrodes, hydrogen ions are conducted through the membrane from the oxygen output side to the oxygen input side. Water which is formed at the oxygen input side migrates through the electrolyte from the oxygen output side to oxygen input side with the hydrogen ions. However, as pointed out previously, as water does not back diffuse rapidly enough from the oxygen input side to the oxygen output side to replenish water at the anode, water which is either dissociated or migrates with hydrogen ions, so that an additional water supply is required. This is most easily accomplished by supplying water to the oxygen output side by flooding the anode chamber or through use of wicking. The reactions at the various electrodes are as follows:

At the cathode:

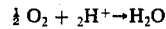

At the anode, $$H_2O \rightarrow \tfrac{1}{2} O_2 + 2H^+ + 2e^-$$

Although an anion exchange membrane may be utilized for oxygen concentration there is an advantage in utilizing a cation exchange membrane in that carbon dioxide picket up from the air is minimized.

In the electrolysis cell of FIG. 2, no gases are supplied to the apparatus but a direct current potential is applied across the anode to the cathode from the battery and a hydrogen containing compound such as water, for example, is supplied at the anode. Dissociation of the hydrogen compound results in hydrogen gas being produced at the cathode while oxygen gas is produced at the anode. With a cation exchange membrane, the reaction at the electrodes are as follows:

At the anode,

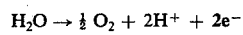

At the cathode:
$$2H^+ + 2e^- \rightarrow H_2$$

In the electrolysis cell just described, the hydrogen containing compound in the form of water required to produce hydrogen and oxygen, for example, by dissociation at the anode is supplied to the anode by flooding the anode chamber or through the use of wicking. This mode of water supply is preferable to a cathode water feed.

It has been found that an improved gas generation apparatus and an improved process for generating gas from the hydrogen containing compound is possible by utilizing an improved catalytic anode which provides superior performance in oxygen concentration and in the generation of oxygen and hydrogen by electrolysis. It was found that reduced platinum-ruthenium alloys containing from 5 to 60 weight percent of ruthenium result in improved pefperformance in that the voltage required is less thereby reducing power consumption during usage. The reduced platinum ruthenium alloy not only has beter performance characteristics as compared to platinum-iridium alloys, but has the additional advantage of being much less costly.

To illustrate the diverse nature of the operational characteristics of a cell utilizing a reduced platinum-ruthenium catalyst and the superior performance compared to a similar device which uses platinum-iridium, a number of cells were constructed containing various combinations of the reduced platinum-ruthenium catalyst at the oxygen evolving anode. These were compared with similar cells using platinum-iridium catalysts of the same or similar composition. The catalyst cathode of each of the cells so constructed contained a platinum catalyst such as platinum black. The electrolyte was a cation exchange membrane having electrodes with active areas of approximately 1/20 ft² operating in a flooded anode mode. The catalytic anodes were bonded electrodes using reduced platinum-ruthenium catalysts. The cells were operated at 150° F. Similar cells employing the same catalytic cathode, same membrane and operating temperature but utilizing a catalytic anode having a reduced platinum-iridium catalyst were also constructed. The performance of the electrolysis unit is shown below in Table I. The cell potential in volts for various current densities in amperes per sq ft (ASF) are set forth for the various combinations of platinum iridium. A Pt-5% Ir and Pt-5% is one combination which was compared. Similarly, Pt-50% Ir is compared to Pt-20% Ru catalyst. In addition, characteristics of a Pt-20% Ru and of a Pt-60% Ru catalyst are also shown.

| INITIAL PERFORMANCE OF REDUCED Pt/Ru and Pt/Ir ANODES AT 150° F | | | | | | |
|---|---|---|---|---|---|---|
| I (ASF) | Pt-5Ir (V) | Pt-5Ru (V) | Pt-50Ir (V) | Pt-50Ru (V) | Pt-20Ru (V) | Pt-60Ru (V) |
| 20 | 1.51 | 1.48 | 1.44 | 1.40 | 1.41 | 1.40 |

-continued

INITIAL PERFORMANCE OF REDUCED Pt/Ru
and Pt/Ir ANODES AT 150° F

| I (ASF) | Pt-5Ir (V) | Pt-5Ru (V) | Pt-50Ir (V) | Pt-50Ru (V) | Pt-20Ru (V) | Pt-60Ru (V) |
|---|---|---|---|---|---|---|
| 40 | 1.54 | 1.50 | 1.48 | 1.43 | 1.46 | 1.43 |
| 60 | 1.57 | 1.52 | 1.49 | 1.45 | 1.48 | 1.45 |
| 80 | 1.58 | 1.54 | 1.52 | 1.47 | 1.50 | 1.47 |
| 100 | 1.61 | 1.55 | 1.53 | 1.49 | 1.51 | 1.48 |
| 150 | 1.64 | 1.58 | 1.57 | 1.53 | 1.54 | 1.50 |
| 200 | 1.67 | 1.60 | 1.59 | 1.56 | 1.54 | 1.53 |
| 250 | 1.70 | 1.62 | 1.62 | — | 1.60 | 1.56 |
| 300 | 1.73 | 1.64 | 1.63 | — | 1.63 | 1.58 |

As may be seen from the data, the reduced platinum ruthenium compositions in each instance exhibit better performance than the corresponding platinum catalyst. The data shown in Table I is partially illustrated graphically in FIG. 3 in which the cell potential in volts is plotted along the ordinate and the current density in amps/sq ft is plotted along the abscissa. Curve 30 is the curve for a cell utilizing a reduced platinum-50% iridium anode. Curve 31 shows the characteristics of a platinum-5% ruthenium anode. Curve 32 shows the operating characteristic of the cell using a platinum-5% iridium catalyst. Curve 34 shows performance for a platinum-20% ruthenium anode and curve 35 a platinum-60% ruthenium anode. Thus, it can be seen from the Table I and the curves of FIG. 3 that in every instance the platinum ruthenium alloys provide better performance than corresponding reduced platinum iridium catalyst. It can also be seen that as the concentration of the ruthenium increases, the performance increases vis-a-vis other platinum ruthenium alloys. In fact, although a range of from 5 to 60% may be utilized the preferred range is from 25 to 60%. The practical upper limit is 60% ruthenium because above 60% the electrode becomes fragile and does not have sufficient structural integrity.

One of the cells utilizing a platinum-60% ruthenium anode operating at 100° F in a flooded anode mode was then tested as a function of cell temperature at different current density levels from 20 to 300 amps/sq ft. The results are illustrated graphically in FIG. 4 in which cell potential is plotted along the ordinate and the average cell temperatures in ° F along the abscissa. The family of curves 36 through 40 clearly shows that for any given current density the operational characteristic improves as the temperature improves. Thus, in Curve 40 which represents a current density of 20 amps/sq ft, at 80° F the cell potential required to produce electrolysis of water is approximately 1.48 volts whereas at 180° F the cell potential required to produce electrolysis is approximately 1.39 volts. Thus, the temperature at which the cell was operated can have a significant effect on the operational efficiency of the cell. The remaining curves 36, 37, 38, 39 respectively show the temperature voltage characteristics of the cell at 300, 200 amps/100 and 500 amps sq ft respectively.

Three electrolysis cells containing respectively reduced platinum 5% ruthenium, reduced platinum-5% iridium, and reduced platinum-60% ruthenium anodes were lift tested at 100 amps/sq ft at 150° F with a flooded anode to determine whether the cells containing platinum ruthenium alloys maintain superior performance over a long period. The results of these tests are shown graphically in FIG. 5 in which cell voltage is again plotted along the ordinate and the time along the abscissa. Curve 42 represents the platinum-5% iridium catalyst. Curve 43 the cell using the reduced platinum 5% ruthenium catalyst, and curve 44 the reduced platinum-60% ruthenium anode. It can be observed that cells containing platinum ruthenium anodes appear to be equal or superior in performance to those containing platinum iridium. Steady state terminal voltages observed for cells containing platinum-5% ruthenium and platinum-5% iridium are 1.58 and 1.6 volts respectively at the 100 amps/sq ft. The steady state terminal voltage observed for a cell containing the platinum-60% ruthenium is 1.54 volts. Initially the performance of the platinum ruthenium electrodes is even better than the above figures, but after approximately 1200 hours, the performance degrades somewhat and reaches a steady state voltage. It can be seen therefore, that reduced platinum ruthenium alloys are superior as oxygen evolving electrodes to platinum iridium alloys not only initially but during the entire lifetime and thus results in superior performance at lower cost.

While other modifications of the invention and variations thereof which may be employed within the scope of the invention have not been described, the invention is intended to include such modifications as may be embraced within the following claims.

What is new and desired to be secured by Letters Patent of the United States is:

1. In a method for electrolytically generating oxygen, the steps comprising,
   a. providing a catalytic cathode,
   b. providing a catalytic oxygen evolving anode,
   c. positioning a ion exchange membrane between and in electrical contact with the cathode and the anode,
   d. providing a direct current potential between the cathode and the anode, supplying water to one of the electrodes to be acted on electrochemically to evolve oxygen at the anode,
   e. the improvement comprising the step of providing a catalyst at the oxygen evolving electrode, consisting of a platinum-ruthenium alloy comprising reduced oxides of platinum and ruthenium and containing from 5 to 60 weight percent of ruthenium.

2. The method according to claim 1 wherein hydrogen and oxygen are generated at the cathode and anode respectively, which includes the steps of providing water at the anode electrode and the step of providing a catalyst at the oxygen evolving anode consisting of a platinum-ruthenium alloy containing reduced oxides of platinum and ruthenium and containing 5 to 60 weight percent of ruthenium.

3. The method for electrolytically generating oxygen from oxygen contained in a gaseous stream by concentrating the oxygen at, the anode, the steps comprising:
   a. providing a catalytic cathode,
   b. providing a catalytic anode,
   c. positioning an ion-exchange-membrane between and in electrical contact with the cathode and anode,
   d. providing a direct current potential between the cathode and the anode,
   e. providing a gaseous stream including oxygen at the cathode,
   f. supplying water to one of the electrodes to be acted on electrochemically,
   g. the improvement in combination therewith; of providing a catalyst at the oxygen evolving anode consisting of a platinum-ruthenium alloy comprising reduced oxides of platinum and ruthenium and containing 5 to 60 weight percent ruthenium.

* * * * *